June 11, 1968  R. C. BENTON ET AL  3,388,023
CONTINUOUS ETCHING MACHINE HAVING A CONTROLLED CONVEYOR SPEED
Filed Oct. 11, 1966  6 Sheets-Sheet 1

Inventors:
Robert C. Benton
Blair W. Heffner
By John W. Haines
Atty.

United States Patent Office 3,388,023
Patented June 11, 1968

3,388,023
CONTINUOUS ETCHING MACHINE HAVING A CONTROLLED CONVEYOR SPEED
Robert C. Benton, State College, and Blair W. Heffner, Petersburg, Pa., assignors to Chemcut Corporation, State College, Pa., a corporation of Pennsylvania
Filed Oct. 11, 1966, Ser. No. 585,932
13 Claims. (Cl. 156—345)

ABSTRACT OF THE DISCLOSURE

Continuous etching machine having variable speed conveying means for feeding articles therethrough, and having a speed control including a test cell for controlling conveying speed. The test cell is provided with feeding means for introducing a substrate-mounted control element thereinto, spraying means including an oscillating nozzle for etching the control element to metal breakthrough, drive means for steadily operating the feeding means at a speed proportionate to the speed for the conveying means, and etch rate sensing, speed adjustment mechanism for detecting the breakthrough so as to change the conveyor speed to compensate for failure to timely cause breakthrough or to compensate for premature breakthrough.

---

The present invention relates to etching a series of articles being fed through a conveyorized etcher, and to automatically controlling the speed of the articles while in transit through the main etching chamber of the etcher. It specifically relates to automatic control means for the conveyor of the etcher, characterized by a control element made of the same metal being etched from the articles, and being simultaneously caused to be etched in the control means to a detectible breakthrough point used as a measure of the etch rate in the main chamber. The articles must be conveyed slow enough to become fully etched, and if they pass through the main chamber too fast they will leave underetched, in a state of unsatisfactory quality.

This application is a companion case to a pending Benton U.S. application Ser. No. 432,476 filed Feb. 15, 1965, disclosing apparatus in which the control element in one embodiment consists of a foil of the metal adhering as an edge strip along the articles being etched, a backing of insulating material present in the article serving as the substrate for the bonded-on metal strip. According to that embodiment, the metal strip is eched to breakthrough in a main spray etching chamber of the apparatus, breakthrough being attended by the metal being etched away, and by the bared substrate of the article so etched becoming translucent at that point. Coordination in etch rate between the strip and articles is inherently insured, as for example when there is no timely accomplishment of breakthrough, indicative that the articles themselves are not being timely etched. Automatic slowdown of the conveyor slows both the article and the test strip thereon, so that etch-through in the main body of the article and breakthrough of the strip will occur at the right point irrespective of the strength of the etchant, or loss of strength.

This application is also a companion case to a pending Benton U.S. application Ser. No. 432,475 filed Feb. 15, 1965, wherein the disclosed apparatus includes a control element of the metal, which element is fed into and etched simultaneously in a test cell or sample tank while the articles are etched in the main etching chamber of the apparatus. According to that disclosure, the control element in one form is metal wire, and the breakthrough or discontinuity point occurs when the wire dissolves in the tank of etchant down to a sharp point, leaving only a stub beyond which the previous metal has all vanished. Coordination in etch rate between the respective metal surfaces of the control element and of the articles in the main chamber is assured because of a mechanical connection provided between a feeding means for the control element in the tank and the conveyor feed in the main etching chamber. Coordination in the etchant composition is assured by drawing etchant for the tank and for the main etching chamber from a common, recirculating type source of fluid supply.

According to the present invention, a solid state electronics system is emploeyd in our referred to automatic speed control means, and the system we provide affords very precise conveyor speed regulation and control, enabling rapid and accurate speed adjustments to be made so as to be fully coordinated to etchant strength as the strength of the etchant varies. Hence, changes in the etch rate are automatically accommodated to with high reliability, and with consequent freedom of the articles from underetching, or from overetching to an unwanted degree.

In the illustrative embodiment of our invention as disclosed herein, a separate sample etch cell or test cell is provided in which the control element is etched. The control element comprises a very thin strip of the metal, laminated to a translucent substrate and etched in that cell to the state of, and automatically optically detected at the point of, breakthrough of the metal strip, all as will now be explained. Features, objects, and advantages will either be specifically pointed out or become apparent when, for a better understanding of the invention, reference is made to the following description taken in conjunction with the accompanying drawings, which show a preferred embodiment thereof and in which:

Figure 1:
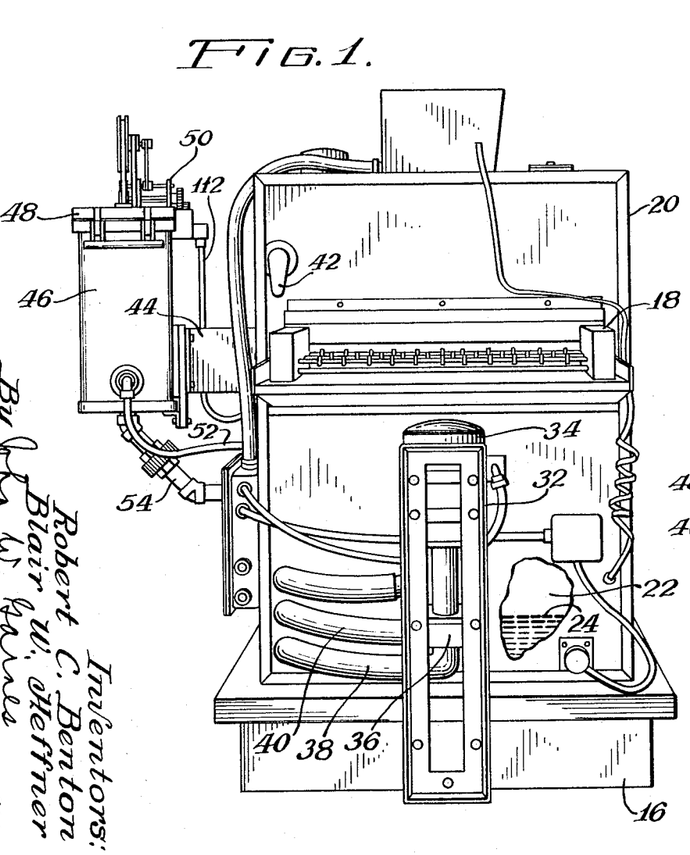
FIGURE 1 is an end elevational showing, viewing the input of a spray etcher embodying the present invention.
Figure 2:
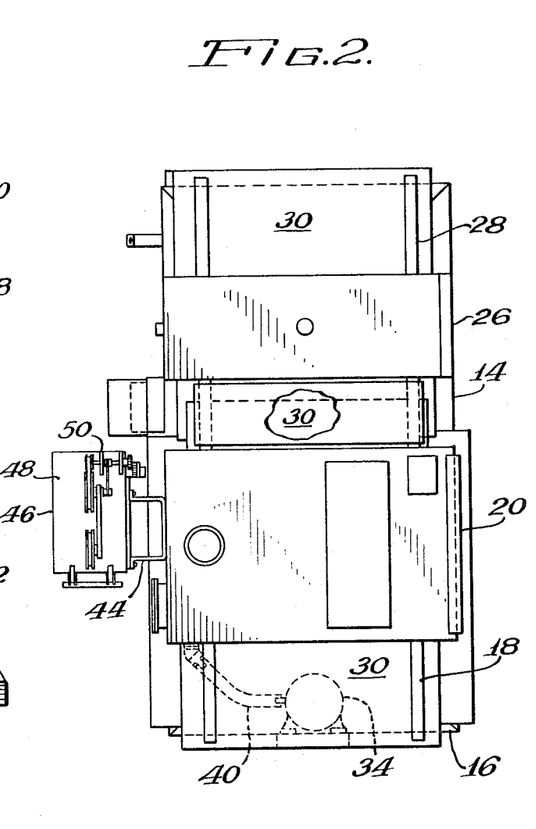
FIGURE 2 is a top plan view.

More particularly in FIGURES 1 and 2 of the drawings, a conventional, conveyorized, oscillating nozzle type spray etcher, generally indicated at 14, is shown which is supported by a base 16 and which supports, in order, an article loading station 18, a central enclosure 20 defining a main etching chamber 22, the chamber 22 forming a tank 24 holding etchant solution in the bottom of the chamber, a longitudinally spaced apart enclosure 26 defining a rinse chamber, an unloading or discharge station 28, and a motor driven roller conveyor table 30 which is horizontally disposed and interconnects the etcher components in the order just recited.

An upstanding bracket 32 at the front of the base 16 supports an etchant supply unit comprising a pump motor 34 and a spray pump 36 operated thereby. The pump 36 is of the centrifugal type and is operated to draw etchant from the tank 24 through an interconnecting suction hose 38 and to deliver it under pressure for spraying through an interconnecting discharge hose 40. A valve stem projecting through the receiving end of the central enclosure supports a valve control handle 42 for adjusting the spray nozzle discharge pressure.

A side bracket 44 at the rear side of the central enclosure supports a vertically disposed etch cell 46. The etch cell 46 includes a hinged lid 48 supporting a feed reel mechanism 50, an interconnecting etchant tube 52 leading between the pump discharge hose 40 and an oscillating spray nozzle assembly, not shown, in the cell, and an interconnecting drain pipe 54 connected to a tank formed by the bottom of the cell and leading to the main tank in the bottom of the etching chamber 22.

Figure 3:
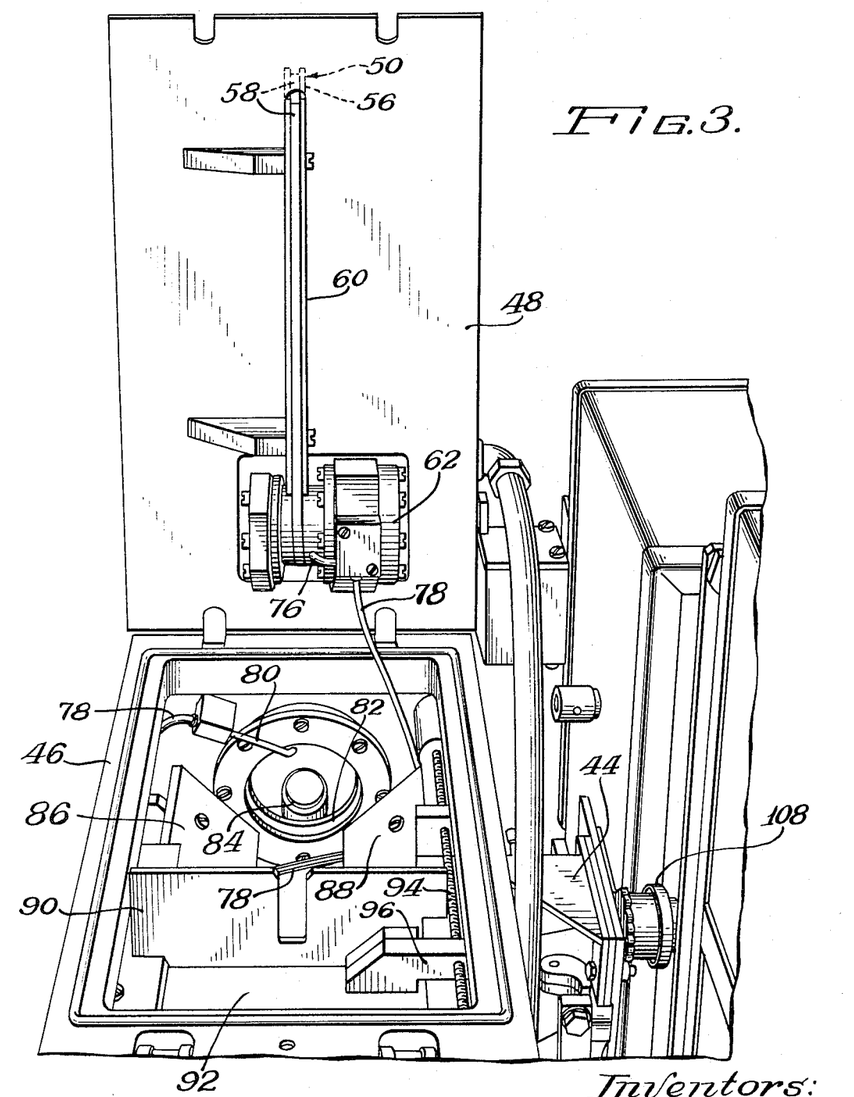
FIGURE 3 is a perspective view similar to FIGURE 1, and showing a cell detail with lid open and to enlarged scale.
Figure 4:
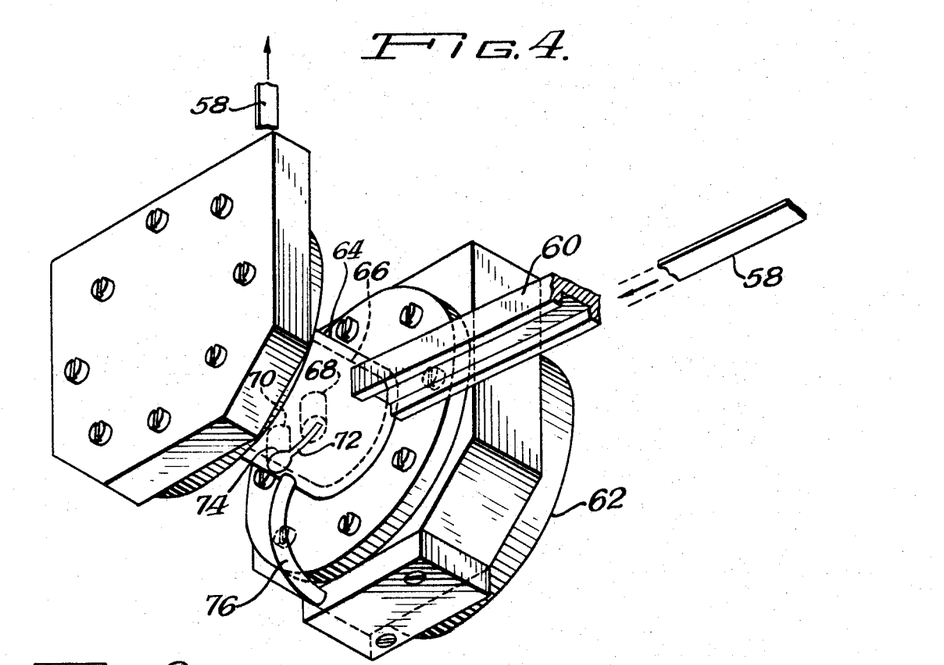
FIGURE 4 is a perspective view similar to FIGURE 3, and showing a housing detail to enlarged scale.

PHOTOCELLS—FIGURES 3 AND 4

A supply reel 56 as it is caused to unwind in the feed reel mechanism 50 supplies the control element 58 from a roll and feeds it in a generally longitudinally extending path along a tape guide 60 carried on the underside of the lid 48 of the cell. The control element 58 leaves the guide and passes partway around the reduced center section of an hour-glass shaped photocell housing 62, curving on an arc from a horizontal position to a vertical position leading upwardly to take up means, not shown, in the feed reel mechanism 50. The housing 62 is carried on the underside of the lid 48 in line with a tape slot in the guide.

The referred to center section of the photocell housing 62 includes a cylindrical glass envelope 64 containing a photocell mounting block 66. An etch sensing photocell 68 in the block and a light level monitoring photocell 70 are physically in series along the arcing path of movment of the control element 58, and register respectively with the narrow slot portion 72 and the enlarged intersecting circular portion 74 of an aperture providing a clear area in the glass envelope 64. Otherwise the envelope 64 is marked so as to be opaque to incoming light to the photocell mounting block 66.

Air is supplied to the housing 62 so as to be directed in a jet by an outlet tube 76 onto the passing control element adjacent the photocell, and so as to be directed through an outlet hose 78 whence it is discharged by a jet tube 80 through a porthole 82 in the rear end wall of the cell 46.

The control element 58 is completely opaque up until the point of breakthrough, and thereafter it becomes completely translucent so that the photocell 68 will react to external light as a means of detecting timely breakthrough by the etchant, as will be described hereinafter.

Figure 5:
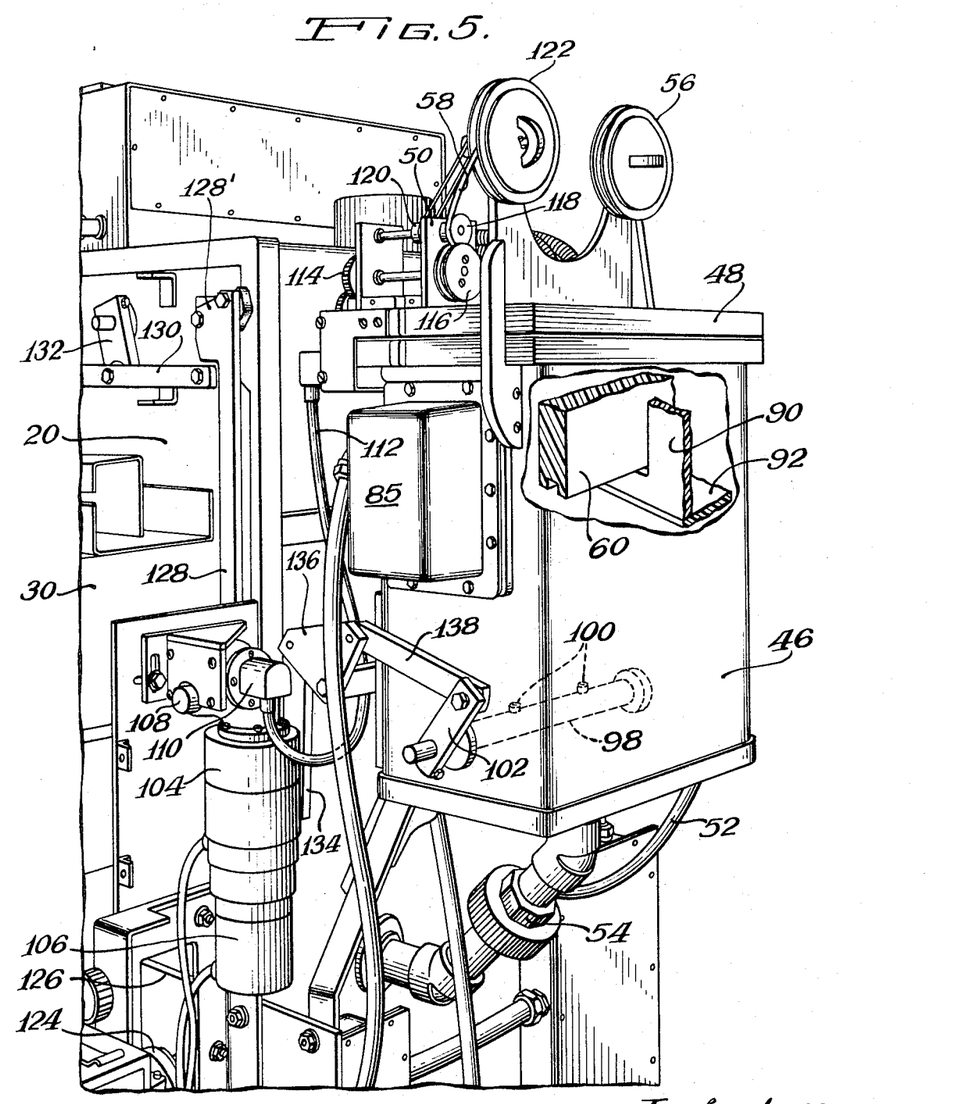
FIGURE 5 is a perspective, three-quarters, elevational showing of the etcher of FIGURE 1, viewing the rear side and output end.

ETCH CELL—FIGURES 3 AND 5

In the upper rear portion of the etch or test cell 46, the porthole 82 is operatively aligned with the photocell housing 62 and provides a direct path for light from a lamp 84 housed in an external lamp chamber 85 (FIGURE 5). The jet tube 80 closely confronts the face of the lamp lens to continually blow away accumulating etchant therefrom.

The upwardly spraying etchant in the cell 46 is blocked except in the path afforded between two diagonally disposed fixed baffles 86 and 88 in the sides of the cell. The spray is also blocked by a baffle means including a slotted vertical shield 90 and an adjoining horizontal shield 92. The baffle means is adjustable as a unit fore and aft in the cell by means of a leadscrew 94. The leadscrew is rotatable and is threaded through a nut carried by a lug portion 96 of the baffle means, and the slot in the shield 90 accommodates the control element guide 60 without interference from the latter. The baffle means enables longitudinal adjustment of the effective length of the control element which is exposed to the upwardly directed spray source, now to be described.

The spray source is an oscillating nozzle assembly comprising a generally longitudinally extending, rocking spray tube 98 in the bottom of the cell 46, and a plurality of generally upwardly directed spray nozzles spaced apart longitudinally in the wall of the tube 98. The tube 98 is hydraulically connected at one end to the etchant tube 52 by means, not shown, and the tube 98 is mechanically connected at the opposite end with a crank arm 102 forming oscillation means whereby the nozzles of the oscillating assembly can be oscillated between opposite positions each disposed at an acute vertical angle.

COMMON DRIVES—FIGURE 5

A conveyor motor 104 which carries a tachometer 106 on the shaft therewith operates through one portion of a gear head 108 to drive the mechanism of the conveyor table 30. The motor 104 operates through another portion 110 of the gear head to supply torque to the feed mechanism 50 in a path including a flexible cable 112, gearing 114, a capstan drive including a lower drive roller 116 and a spring biased pressure roller 118, a take up pulley 120 which is fast to a shaft common to the pressure roller 118, and which has a drive belt, not shown, and thence to a take up reel 122 which is driven by the drive belt from the pulley 120.

By reason of the foregoing interconnection through the gear head 108, the rollers in the conveyor table 30 are driven at all times at a speed proportional to the feed speed of the control element 58.

Nozzle oscillating motor structure 124, indicated by the top or gear head portion thereof actually illustrated in FIGURE 5, delivers reciprocating motion in the etcher and is connected by a link to a horizontal reciprocally movable, lower oscillator link 126, thence to an interconnecting vertically movable oscillator link 128, and thence transmits power in two paths. In the first path, the vertical link 128 is connected through a bellcrank 128' on the central enclosure 20, a horizontal, reciprocally movable upper oscillator link 130, and thence through a series of cranks 132 to the upper oscillating nozzles in the main chamber of the central enclosure 20. In the other path, the vertical link 128 is connected through a diagonally vertical link 134, a bellcrank 136 carried by the cell 46, and thence through a horizontal link 138 to the oscillation crankarm 102 for oscillating the nozzles in the cell 46.

The spray nozzles in the cell 46 cause the sprays to sweep across the control element in vertical planes transverse to the path of movement of the control element, and are operated in synchronism with the operation of the oscillating upper nozzles and lower nozzles in the enclosure 20. The nozzle assemblies are parallel to the article movement, and the lower nozzle assemblies in the enclosure, which are not shown, are operated by the lower oscillator link 126.

Figures 6, 7:
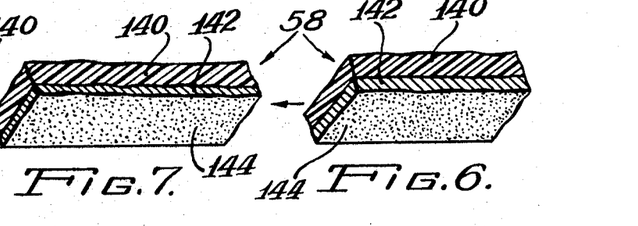
FIGURES 6, 7 and 8 are longitudinal sectional views of a control element to enlarged scale, and taken along the respective lines VI—VI, VII—VII, and VIII—VIII of FIGURE 9.
Figure 8:
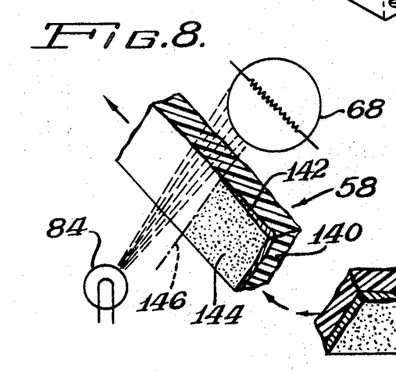

BREAKTHROUGH—FIGURES 6, 7, AND 8

In the control element 58, a flexible substrate 140 carries a foil 142 of metal which is bonded thereto by a lamination process and which covers the face of the substrate exposed to etchant. The substrate is as narrow as the foil and, for purposes of the present photocells, is sufficiently thin to be transculent when bared of the metal.

The metal foil 142 is thin so as to readily flex and has the same composition as the metal surfaces being etched in the etcher. In printed circuit board articles, for example, the metal surface of the board blank is copper and the control element 58 used while etching copper would include copper of essentially the same composition as the metal foil 142. Because of oapacity of copper, the exposed face 144 of the control element makes it opaque and this opacity characteristic obtains even when as little as a monomolecular thickness of copper is present.

In FIGURE 7, in which the metal strip 142 is shown having been reduced to part thickness due to sustained spray etching, the element nevertheless maintains its opacity at the surface 144 so that light cannot penetrate through the otherwise translucent substrate 140.

In FIGURE 8, sustained etching theretofore has produced breakthrough of the metal layer 142 so that the surface 144 disappears from the substrate at the breakthrough or division line 146. Consequently at all points past the division line 146, light from the lamp 84 shines through the bare substrate 140 and is detected by the sensing photocell 68.

Ideally, the present automatic control is calibrated with one half of the photocell surface blanked off so that a null signal will appear in the output of the photocell 68, indicating that breakthrough is occurring with the division line midway along the photocell face, i.e., in exact transverse registry therewith.

Under initial conditions of rising temperature and increasing activity of the etchant upon start-up of the machine, the division line 146 will tend to shift generally to the right as viewed in FIGURE 8, indicative of premature breakthrough which will create in the photocell 68 a lowered resistance due to an increase of light. Both photocells are preferably photoresistors.

As the etch rate decreases after a long period of chemical attack by the etchant solution, the division line 146 transfers to the left as viewed in FIGURE 8. Consequently, less light falls on the photocell 68 and the photocell affords higher resistance indicative of untimely breakthrough occurring.

Figure 9:
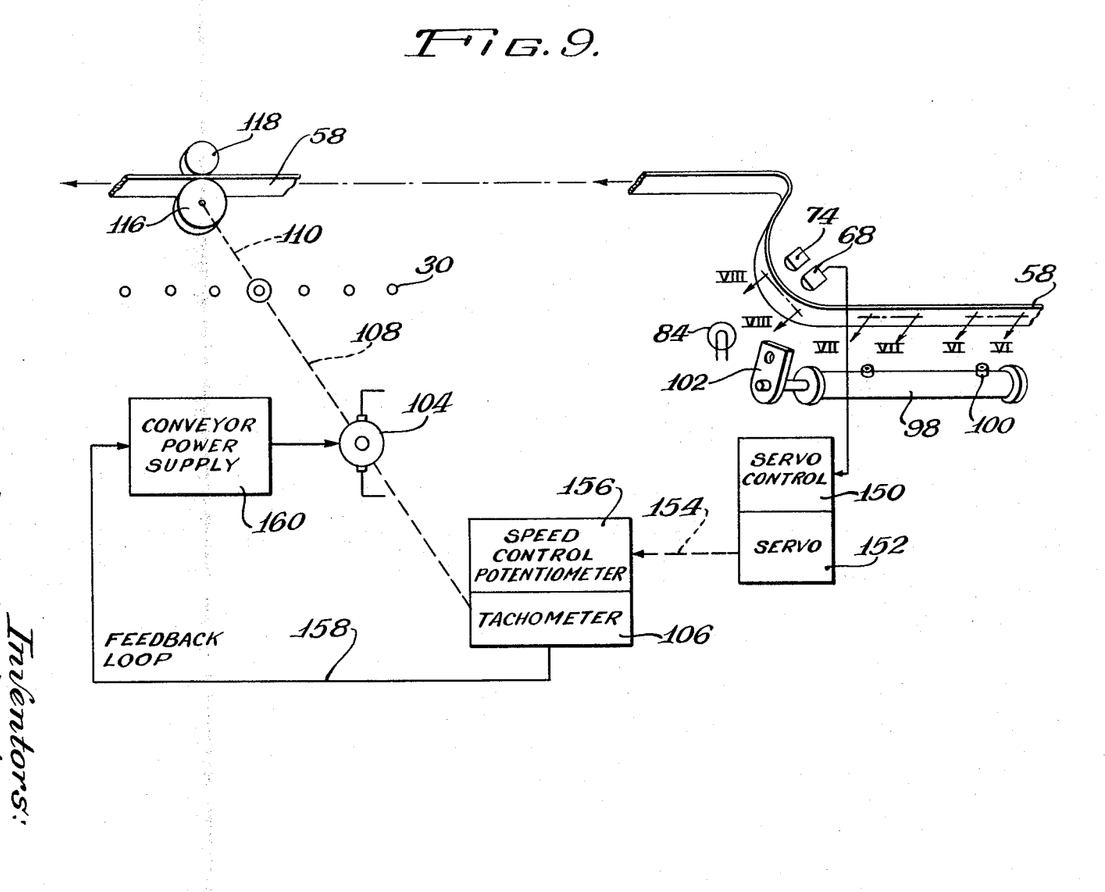
FIGURE 9 is a block diagram of the electrical control system.

BLOCK DIAGRAM OPERATION—FIGURE 9

The referred to output of the sensing photocell 68 is applied to a servo control indicated by a block 150, the control controlling a reversible servomotor 152. A mechanical connection 154 between the servomotor and a speed control potentiometer 156, and electrical connections between the potentiometer and the tachometer 106 enables the used portion of the tachometer output to be automatically varied as it is applied in a feedback loop 158. The feedback loop 158 controls a conveyor power supply 160 which is connected to the conveyor motor 104 in a manner to keep the speed unidirectional and accurately controlled by closed loop operation.

The monitoring photocell 74 has a posterior position relative to the sensing photocell 68, and theoretically only bare substrate ever intervenes between the lamp 84 and the monitoring photocell 74. The photocell 74 is used to maintain unvarying brightness in the lamp as it ages, and the operation is explained hereinafter.

Figure 10:
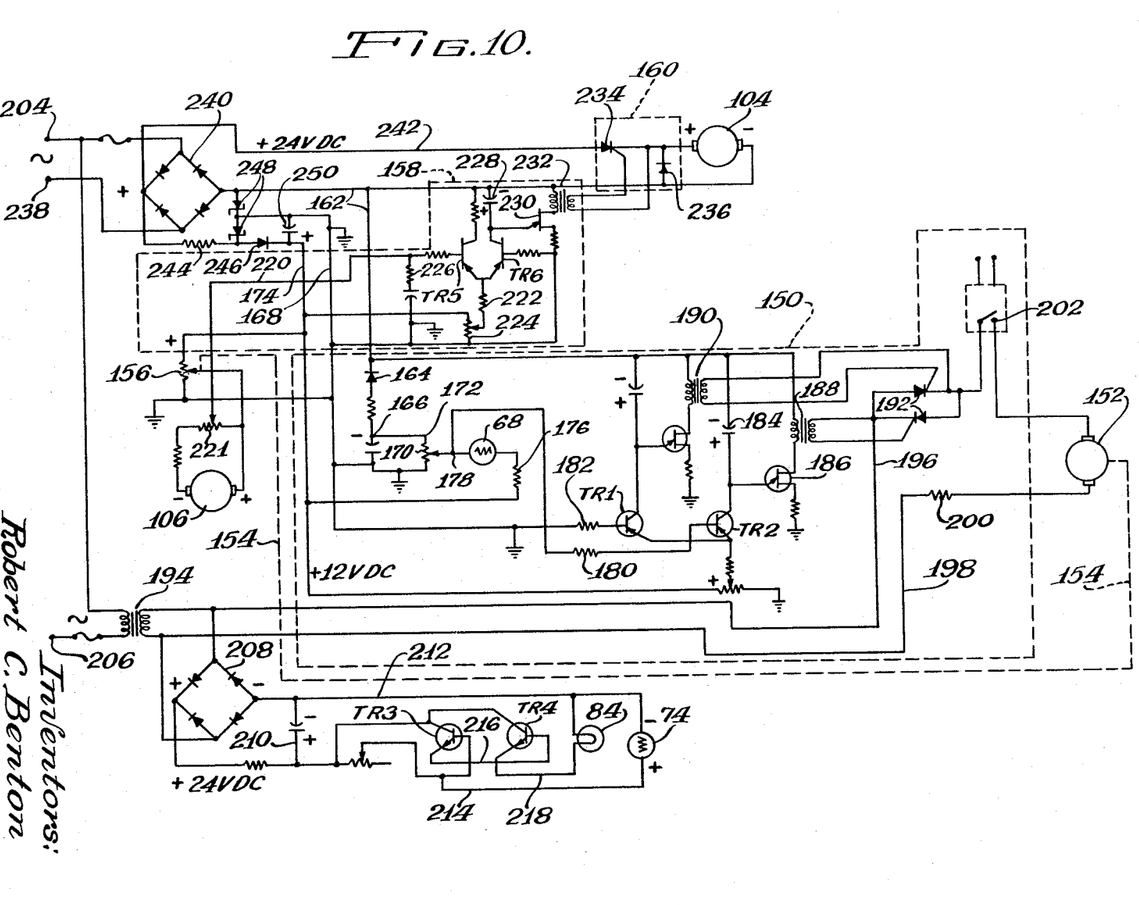
FIGURE 10 is a schematic diagram thereof.

SERVO CONTROL 150—FIGURE 10

The servo control 150 operates the servomotor 152 which, as indicated, is reversible. The servo control comprises an input section including the photocell 68, an intervening amplifier section, and finally a power output section which is connected to the servomotor 152.

In the input section just referred to, a supply line 162 supplies —24 v. chopped DC voltage through a diode 164 and a filter generally indicated at 166 which is connected to the anode of the diode. Another supply line 168 is a common line which is connected to the ground terminal of a potentiometer 170, which potentiometer has the other terminal 172 thereof connected by the filter 166 to the filtered —24 voltage aforesaid.

Another supply line 174 supplies plus 12 volt filtered DC through a resistor 176 to one side of the photocell 68. The photocell 68 is connected at the other side to a junction 178.

The junction 178 has a branch leading to the slider of the potentiometer 170 and another branch connected through a resistor 180 to a transistor TR2. The common line 168 is connected through a resistor 182 to a transistor TR1.

The voltage swing of the junction 178 is above and below the ground potential of the common line 168, in dependence upon the amount of light falling upon the photocell 68. The initial adjustment for null condition is made with the photocell 68 half covered in front of the lamp 84, whereupon the slider of the potentiometer 170 is moved to a tapping point such that the negative biasing current supplied by the base biasing resistor 180 to its transistor base electrode is equally matched to the flow of negative current supplied by the base biasing resistor 182 to the base electrode of transistor TR1.

Thereafter, changes in light cause the voltages of the respective resistor 180 and base of the transistor TR2 to go either positive or negative with respect to the corresponding resistor 182 and base of the transistor TR1.

The transistors TR1 and TR2 constitute a differential amplifier, and a description of the transistor TR2 will suffice for both transistors. The transistor TR2 is the current charging source for a timing capacitor 184 which periodically builds to a pre-determined charge. A unijunction transistor 186 is connected through the primary winding of a transformer 188, in a loop in series with the transistor TR2 and the capacitor 184 so as to discharge the capacitor each time it accumulates the pre-determined charge thereon. The repetitive discharges create the output of the loop, which is delivered from the transformer.

The transformer 188 of one loop and a companion transformer 190 of the other loop control the respective gate electrodes of a pair of semi-conductor controlled rectifiers 192, preferably SCR's. The dual wires leading from a step-down power supply transformer 194 are utilized by connecting one wire 196 to the anode of one SCR and to the cathode of the other, and by connecting the other wire 198 through a resistor 200, the servomotor 152, and thence through a delay timer switch 202, to the cathode of one SCR and to the anode of the other SCR.

The servomotor 152 is normally in a rest condition with slight dither, the signals thereto from the transformers 188 and 190 being sent in alternation to one another and at corresponding phase angles to one another in their alternate cycles. The SCR's 192 conduct slightly, with the same strength but in alternation, and oppositely, to one another to maintain the motor static.

Increased light on the surface of the photocell 68 decreases its resistance and reduces the negative biasing current applied by the junction 178 to the base electrode of the transistor TR2. The transistor TR2 has a decrease in emitter-collector current, the timing capacitor 184 cycles slower, and there is a retarding of the phase angle of the signal of the transformer 188 to the gating electrode of the associated SCR 192. Comparatively then, the other SCR 192 supplies the greater amount of power to the motor 152 on its alternate pulses, causing the motor 152 to commence to rotate in a given direction.

An opposite result occurs if the photocell 68 is darkened, and the motor 152 rotates in the opposite direction.

The switch 202 in the delay timer eliminates constant running of the motor 152, to avoid overshoot and hunting. The preferred operation, hereinafter described, is for the motor to keep adjusting until breakthrough occurs at the right point, and for the motor 152 then to stop.

MONITORING PHOTOCELL—FIGURE 10

The transformer 194, having an AC input from two terminals 204 and 206, supplies a full wave, bridge rectifier 208. The rectifier 208 has a filtered output of forty-eight volts which is supplied from a filter indicated at 210 to the lamp 84.

The lamp 84 shines through the bared control element onto the monitoring photocell 74, and the photocell controls the impressed voltage on the lamp to maintain a constant light level or brightness.

More particularly the photocell 74 which is connected at one side to a —24 v. DC line 212 in common with the lamp 84, is connected at the other side through a line 214 to the base of a first transistor TR3. The transistor TR3 through an emitter connection 216 controls the bias on the base of a second transistor TR4. An emitter connection 218 from the transistor TR4 controls the voltage applied to the lamp 84.

In operation, decreased light falling on the monitoring photocell 74 increases the resistance thereof and causes an increase of positive biasing current on the base electrode of the first transistor TR3, which conducts more heavily. The second transistor TR4 is biased with an increase of positive current from the first transistor so as to conduct more heavily in the emitter-collector path thereof, and it increases the voltage in the connection 218 and on the lamp 82, to bring the latter back up to the desired light level.

The lamp voltage adjustments caused by the monitoring photocell 74 take place automatically in this way until the lamp eventually fails, but without the brightness having been impaired.

FEEDBACK LOOP—FIGURE 10

In the feedback loop 158, a main conductor 220 thereof leads from the slider of a second potentiometer 221 connected across the output of the tachometer, to a phase inverting transistor TR5 and a charging transistor TR6, which are connected in a common emitter arrangement. The two transistors constitute a differential amplifier, they operate generally after the manner of a cathode follower, and they are connected to ground through a series connected resistor 222 and a voltage-providing potentiometer 224.

More specifically, the output from the second potentiometer 221 is applied by the main conductor 220 through a filter generally indicated at 226 to the base of the transistor TR5. An increase of bias of negative current on the base of transistor TR5 causes increased conduction thereof and decreased conduction in the charging transistor TR6. The charging rate of a timing capacitor 228 which is series connected in a loop with the transistor TR6 is decreased, so that the repetitive discharges thereof by a uni-junction transistor 230 in the loop are decreased in frequency.

The output of the loop is applied by a coupling transformer 232 to the gating electrode of a silicon controlled rectifier 234, which rectifier supplies current in pulses of varying amounts to the motor 104 in the conveyor. Specifically, the rectifier 234 is connected in series with the conveyor motor 104 whereas a dipole 236 which is connected in parallel with the motor is so poled that the cathodes of the two rectifiers 234, 236 are connected together. Reduced output of signals from the transformer 232 causes reduction in speed of the motor 104.

In sum, an increase of negative current in the main conductor 220 causes a reduction in speed of the conveyor motor 104, and vice versa.

An AC power input to the terminal 204 and a terminal 238 energizes a full wave rectifier bridge 240 providing a forty-eight v. DC output. One branch 242 from the positive terminal of the bridge supplies the motor 104 at one side through the rectifier 234, and the negative terminal of the bridge supplies the chopped —24 v. DC to the supply line 162 and also to the other side of the motor 104.

The other conductor from the positive terminal of the bridge 240 is connected through a resistor 244 and a rectifier 246 to the plus 12 v. DC supply line 174. Two Zener diodes 248 and the just noted resistor 244 connect the common line 168 to the respective terminals of the bridge, and a capacitor 250 is connected between the common line 168 and the supply line 174 as part of a filter network for the line 174.

In overall operation of the schematic circuit as shown in FIGURE 10, negative current flow automatically increases in the feedback loop conductor 220 from either of two conditions. When the motor 104 overspeeds in relation to the speed setting for which the tachometer circuit has been set, the left end of the output potentiometer 221 becomes more negative due to the consequent overspeed of the tachometer, and the increased negative base current bias on the transistor TR5 causes slowdown of the motor 104.

Darkening of the photocell 68, indicative of the other condition of less strength in the etchant, causes the servo-motor 152 through the connection 154 to move the slider on the potentiometer 156 downwardly as viewed in FIGURE 10. The slider of the potentiometer 156 taps off a higher negative voltage than before. The slider is in series with the positive terminal of the tachometer 106, causing increased negative voltage on the negative terminal of the tachometer and consequently an increase of negative current in the feedback loop conductor 220. The motor 104 slows.

The converse is equally true for the sensing photocell 68 and the tachometer 106. More illumination on the photocell or underspeeding of the tachometer, or both, cause an increase in speed of the conveyor motor 104.

In the normal running condition, there is no change in the conveyor and control element speed and the servomotor 152 rests in a null condition. The constant rate of conveying and the servo null will exist as long as breakthrough occurs in registry with the center of the sensing photocell 68, thus establishing a resistive balance within the transistor differential amplifier of the servo control 150. So as to insure constant workable quality of the etched articles, a desired range of overetching is selected, e.g., between a 40% and an 80% overetch; upon start-up of the apparatus, the feed of the control element is set at a running speed productive of servo null and the corresponding speed of the conveyor at the time it is placed under automatic test cell control is set to produce enough overetch to be about midway in the overetch range selected.

Coordination results because of the mechanical connections resulting first by mechanically interconnecting the main conveyor and the control element feed means, and second by mechanically interconnecting the oscillating spray nozzles in the cell and the oscillation linkage for the spray nozzles in the main etching chamber. Finally, coordination is assured by the fluid interconnection of the main etchant pump and the oscillating spray nozzles in the cell, and by the identical or at least similar composition of the metal surfaces of the articles and of the control element. So a practically exact analog control results, with the etch rate in the cell being squarely analogous to the etch rate taking place under generally the same conditions maintained in the main etching chamber.

In one physically constructed embodiment of the invention, the control element consisted of a narrow flexible tape of etch resistant plastic, to which a strip of copper foil had been laminated across the full width of one side of the tape to make it opaque. Mylar tape is a satisfactory commercial plastic tape for the purpose.

Variations within the spirit and scope of the invention described are equally comprehended by the foregoing description.

What is claimed is:

1. Speed control means for a conveyorized etcher employed in etching metal from articles, said conveyorized etcher having a motor drive which responds to closed loop feedback, said speed control means comprising:
   feed means for moving a control element of the metal through a path in a spray chamber;
   means in the chamber, directed transverse to the path of movement, for spraying etchant on the control element to etch an exposed portion of the test strip to breakthrough; and
   sensing means disposed along the path of movement for detecting breakthrough;
   said sensing means having closed loop means coupled in the output thereof for applying a control output to said drive, to cause increased feedback and consequent decreased drive speed in response to underetching as measured by late breakthrough of the control element, or to cause decreased feedback and a consequent increased drive speed in response to overetching as measured by premature breakthrough.

2. A continuous spray etcher effective for the removal of material from articles to be etched and a control element, said etcher having:

inlet and outlet stations;

spray chamber means operatively located therebetween;

a drive motor to operate conveying-means for said articles to advance them between said stations, said conveying-means drive motor having a closed feedback loop to which is fed a current sensed from the control element so as to regulate the speed of said conveying-means as a function of said control current;

separate feed means for said control element to advance said element, which is in the form of a continuous elongate control element, into a path of exposure to the etchant of the etcher; and sensing means for automatically sensing the degree of removal of material from the exposed portion of the control element by etchant applied thereto in said path;

said sensing means being connected to said conveying-means to regulate its speed in response to the degree of the material removal sensed, by regulating the speed of the conveying-means drive motor.

3. The invention of claim 2, characterized by means in said path of exposure comprising plural spray nozzles for simultaneously applying etchant of the etcher transversely to an exposed portion of the control element.

4. The invention of claim 3, characterized by nozzle means in the spray chamber means which, with said plural spray nozzles, have a common nozzle drive source to jointly oscillate said nozzle means and plural spray nozzles.

5. The invention of claim 2, characterized by means of enclosure about said path of exposure comprising an etch cell separate to and spaced apart from the spray chamber means, and having a common etchant source to supply the same etchant to both.

6. The invention of claim 2, characterized by speed sensitive means responsive to said drive motor and establishing direct cooperation in the feedback loop to vary the control current in response to actual motor speed.

7. The invention of claim 6, said speed sensitive means characterized by a tachometer driven by the motor and generating an output which increases with increases in motor speed; and coupling means applying output of the tachometer in the closed loop for decreasing speed of the motor when it overspeeds, and vice versa.

8. The invention of claim 7, characterized by:

a potentiometer to which said sensing means is connected and operatively arranged to raise the potentiometer output in response to sensing underetching; and means applying the output of the potentiometer to the tachometer coupling means in a manner whereby increases of output of the former cause increases of tachometer output in the loop, thus affording in the desired way a decrease of speed of the drive motor and article conveying-means in response to underetching sensed by the sensing means.

9. The vacuum of claim 2, the sensing means characterized by the photoelectric means.

10. The invention of claim 9, the photoelectric means characterized by:

a light source of increasable power and a first photocell operatively cooperating from opposite sides of the control element to detect the presence or absence of remaining material in the control element; and a second photocell photosensitively responsive to the light level of the source and having an electrical control connection thereto effective to cause increased power of the source in response to age-dimming of the light, thereby maintaining substantially constant light level.

11. The invention of claim 9, the photoelectric means characterized by a light source and a photocell operatively cooperating in a line of light in which the confronting control element intervenes; and means to blow away etchant droplets encroaching in the line of light to the photocell.

12. The invention of claim 2, characterized by:

baffle means along the path of said control element provided with means for longitudinally adjusting the baffle means to change the effective length of the exposed portion of said element.

13. The invention of claim 2:

the control element characterized by a laminated construction comprising metal foil and an elongate substrate carrying the foil;

said foil being formed of the same material essentially as etched from the articles;

said feed means for said control element being connected to the drive motor so as to be driven thereby at a speed in fixed ratio to the speed of the conveying means.

References Cited

UNITED STATES PATENTS

| | | | |
|---|---|---|---|
| 2,724,918 | 11/1955 | Triman | 156—345 |
| 3,032,753 | 5/1962 | Knapp et al. | 340—267 |
| 1,951,426 | 3/1934 | Littler | 134—57 |
| 3,300,362 | 1/1967 | Crossfield | 156—345 |

FOREIGN PATENTS 673,706  11/1963  Canada.

JACOB H. STEINBERG, *Primary Examiner.*

UNITED STATES PATENT OFFICE
CERTIFICATE OF CORRECTION

Patent No. 3,388,023　　　　　　　　　　　June 11, 1968

Robert C. Benton et al.

It is hereby certified that error appears in the above numbered patent requiring correction and that the said Letters Patent should read as corrected below.

Column 1, line 19, for "for" read -- of --; line 68, strike out "to", second occurrence; column 3, line 35, for "marked" read -- masked --; column 4, line 64, for "oapacity" read -- opacity --; column 10, line 8, for "vacuum" read -- invention --.

Signed and sealed this 4th day of March 1969.

(SEAL)
Attest:

Edward M. Fletcher, Jr.　　　　　　　　　EDWARD J. BRENNER
Attesting Officer　　　　　　　　　　　　Commissioner of Patents